Feb. 17. 1925
1,526,770
O. W. BRAIN
MEANS FOR TESTING FAULTY ELECTRIC LINE INSULATORS
AND INDICATING LEAKAGE THEREIN
Filed May 22, 1923
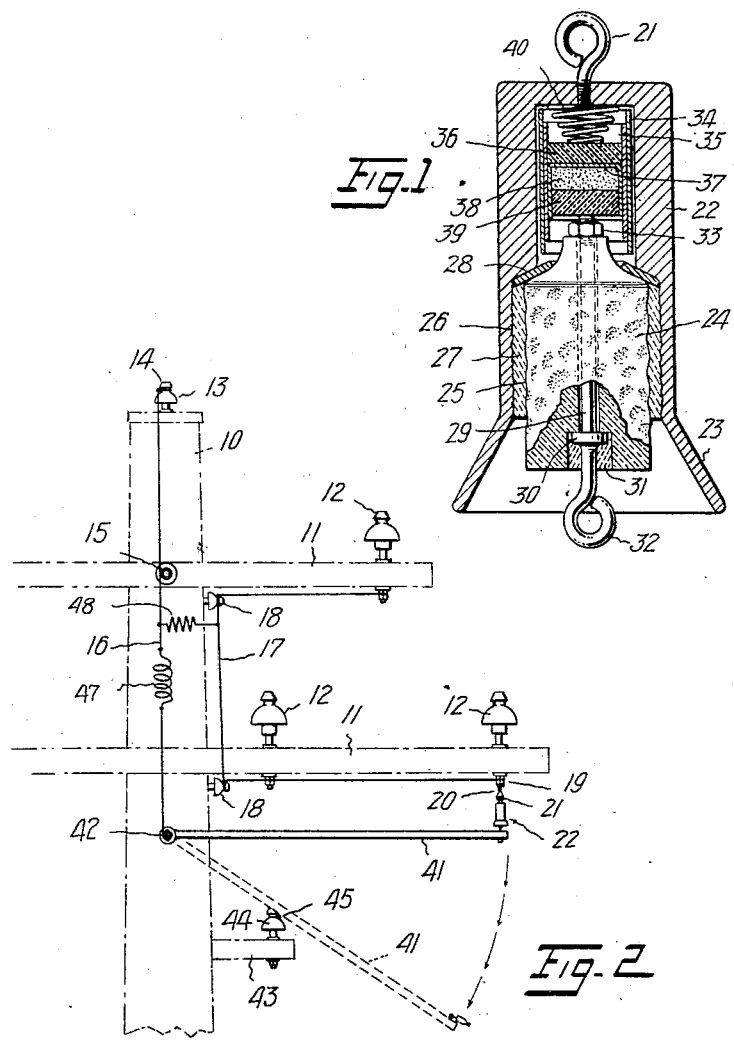

Patented Feb. 17, 1925.

1,526,770

UNITED STATES PATENT OFFICE.

ORLANDO WILLIAM BRAIN, OF ASHFIELD, NEAR SYDNEY, NEW SOUTH WALES, AUSTRALIA.

MEANS FOR TESTING FAULTY ELECTRIC-LINE INSULATORS AND INDICATING LEAKAGE THEREIN.

Application filed May 22, 1923. Serial No. 640,671.

*To all whom it may concern:*

Be it known that I, ORLANDO WILLIAM BRAIN, subject of the King of Great Britain and Ireland, residing at 85 Bland Street, Ashfield, near Sydney, New South Wales, Australia, have invented certain new and useful Improvements in Means for Testing Faulty Electric-Line Insulators and Indicating Leakage Therein, of which the following is a specification.

The present invention has been devised to offer a practical solution for the problem of ensuring continuity of service in electric lines which are liable to failure consequent on electrical breakdown of insulators. As is known to electrical engineers, no initial electrical test can offer any acceptable assurance on the useful term of life of these insulators. Breakdown in insulating value takes place in many cases sooner or later during service, and no means have been yet proposed for informing the linesmen that an electrical breakdown is threatened or is impending, or that abnormal leakage is taking place at any insulator. When failure of an insulator does take place the failure is usually preceded by comparatively heavy leakage of current through the insulator from the line to the insulator pin. This leakage conducted through the insulator pin to the pole cross arm soon sets up heating, and often the first indication of leakage is displayed by the charring or firing of the cross arm.

It is assumed in practice, and it is probably true, that when electrical breakdown of a mechanically sound overhead line insulator takes place it has been preceded for a longer or shorter period by leakage of current from the line to ground through the insulator and pin and cross arm and the pole, and it is usual to submit line insulators to periodical tests to anticipate insulation failure. For this purpose linesmen must visit each pole and by means of suitable electrical testing instruments ascertain whether leakage of current is taking place from it. This testing is costly and includes an element of danger, and on the whole is unsatisfactory in the result. On the other hand periodical removal of current from the line to allow of this testing is frequently troublesome and inconvenient.

My invention provides an indicator with means for displaying it automatically when abnormal leakage of current occurs; these indicators are observable from ground level so that inspection of the line can be made by a linesman whilst driving or riding. Rapid inspection is thus facilitated, with elimination of danger to the inspectors. The indicator used by me is one which is dependent for its operation on effects produced by leakage current. In practice I use a thermally operated or a thermally released device which is operated or released automatically without opening the line. The local visible indicator is also utilized to complete an electric circuit on a signal line when it is in the displayed position and thereby operate an electric alarm and afford means at a station on the line whereby the place of the failure may be located through appropriate electric measuring instruments. The details of application of the invention most appropriate in particular cases may be left to the judgment of competent electrical engineers.

In applying the invention in the case of pin mounted line insulators supported on pole cross arms, a satisfactory method of carrying out the invention is disclosed in the accompanying sheet of drawings, in which,—

Fig. 1 is a sectional elevational view through the release device which is positioned intermediately the insulators on a pole and the indicator on that pole; and Fig. 2 is a semi-diagrammatic elevational view showing the pole equipment.

The equipment is fitted on every pole on the line. One releaser and indicator may be used for any number of insulators which may be carried on the equipped pole.

10 is the pole, 11 wooden cross arms. 12 line insulators of any usual type mounted on metal stud pins which are secured in the cross arms 11. 13 is an insulator fixed on the top of the post or in any other convenient position for supporting an earth line 14. A tap 16 from the line 14 is carried on one or more insulators 15 as may be necessary and is electrically connected to the metal arm 41 which forms the visible indicator. At one end of it this indicator arm 41 is mounted on a pivot insulated from the post 10. The stem pins of the several line insulators on the post are connected together by a wire 17 brought over insulators 18 so that the leakage from all the insulators on the post is collected.

The wire 17 leads to the release device. The most convenient mounting arrangement for the signal releaser consists in supporting it on the bottom end of one of the insulator pins, at 19 for instance. 20 is a metal hook attached to and making good electrical connection with the insulator pin. 21 is an eye pin in the top of the releaser. This eye pin 21 is carried on the hook 20 and suspends the releaser from the insulator pin. The releaser comprises a cylindrical metal case 22 closed at the top and open at the bottom and preferably having its bottom end 23 belled for the purpose of deflecting rain drops. 24 is a porcelain plug which is inserted into the larger lower part of the counterbore in the case 22 and secured therein by means of cement 27, 25 and 26 representing the irregular or roughened faces of the porcelain 24 and of the metal body 22 respectively; a little roughness is desirable in both these parts to ensure effective grip for the cement fastening 27. 28 is a washer of thick cloth impregnated with an insulating compound. 29 is a pin which passes up through the centre of the porcelain plug 24, 30 being a collar on this pin which is contained in a sinking in the bottom end of the porcelain plug 24, said sinking being filled over with cement. 32 is an eye formed on the bottom end of the pin 29. 33 is a nut or other fastening by which the top end of the pin 29 is secured against the top end of the porcelain plug 24.

34 is a varnished paper sleeve inserted in the upper narrow part of the counterbore in the releaser shell 22. 35 is another varnished paper sleeve within the sleeve 34. 36 is a block of carbon. 37 is a paper cartridge containing a charge of explosive powder 38. 39 is a carbon block which plugs the open end of the paper cartridge 37 and makes contact with the explosive powder 38 on its top side, and on its under side makes contact with the top end of the pin 29. 40 is a helical spring abutting against the top end of the metal shell 22 and bearing down on the top of the carbon block 36. 41 is an indicator arm of metal which is suspended at its outer end on the eye 32 and at its inner end is supported pivotally on the post 10 at 42 but is insulated from the post. 43 is a cross arm to carry the insulator 44 on which a bare signal wire 45 is strung. When the arm 41 falls to the position shown in the dotted line it contacts with the signal line 45, connecting that line through the earth line 14 via the tap wire 16.

A choke coil 47 may be inserted in the tap wire 16, the function of this choke coil being to allow flow of leakage current, but to prevent surges of current passing through the device when the line is subject to static disturbances arising from lightning, over-rapid switching, or like known causes which produce a flow of high frequency current in the line.

The function of the paper sheets 34 and 35 is to insulate the powder charge 38 from the walls of the releaser 22. The function of the paper cartridge 37 is to provide a dielectric diaphragm between the powder 38 and either of the carbon contact blocks 36 and 39, the arrangement being such that a leak current from the insulator on which the releaser is hung cannot find a path between the rings 21 and 32 except through the cartridge. When a leaky condition develops in an insulator the releaser terminals are under electrical stress, and when this stress rises above a predetermined point the dielectric 37 is pierced and the powder 38 fired, with the result that the porcelain plug 24 is expelled, and the indicator arm 41 being no longer suspended by it drops by gravity from the normal horizontal position in which it is shown in the full lines in Fig. 2 to the dotted line position in that figure. In the latter position it makes contact with the signal line 45, connecting that line to earth via the tap wire 16 and the earth line 14 and operating an electric alarm at a station. Appropriate testing instruments connected on the signal line 45 operate to show at the signal station the approximate location of the breakdown. The powder 38 is a fine grain black powder which has reasonable electrical conductivity.

A faulty indicator is thus caused by reason of the leakage through it to produce a report of its own failure either solely through the local indicator arm 41 which can be seen from the ground, but also if desired through a signal circuit 45 which is connected when the breakdown occurs and the local signal is displayed.

The paper sheaths are preferably varnished and the cartridge 37 is made of such material and any such thickness that a certain known electrical potential difference is necessary on the respective sides of it to produce breaking down and puncturing.

Tests made with the apparatus establish the fact that leak currents of the order of one milliampere suffice for puncturing the cartridge and exploding the powder in the releaser at any desired voltage within ordinary working ranges in a period of leakage of very short duration, that is to say one minute or less. The dielectric value of the cartridge must be selected appropriately to the leakage condition to be indicated.

It is to be understood that inasmuch as the function of the powder explosion is to cause expulsion of the releaser plug 24 so as thereby to permit the indicator arm 41 to drop, there may be substituted for the explosive powder any other substance which, responsively to the heating effect of a leak current of known dimensions on it, will operate to break the indicator suspension.

The essence of the invention is the utilization of a leak current through or over a line insulator to open a releaser which is located in proximity to such insulator, and is adapted to cause a visible indicator to be displayed.

Whilst, therefore, the particular construction of releaser which has been illustrated is put forward as an effective device for the carrying out of the invention, it is to be understood that it is not the exclusive means available for that purpose.

If the signal line 45 is fitted with appropriate signalling instruments it would indicate at a linesman's room or elsewhere required, the fact that a breakdown had occurred by displaying an appropriate signal whenever the signal line 45 is earthed by contact of an indicator arm 41 with it.

When the device is used under circumstances where the normal leakage current approaches or exceeds one milli-ampere, a high resistance element 48 of suitable form may be connected between the wire 17 connecting the pins of the insulators 12 and the earth wire 16 to prevent operation of the device until a predetermined current of still greater magnitude than the normal leak in service conditions has been reached.

What I claim as my invention and desire to secure by Letters Patent is:—

1. An electric line insulator leakage indicator comprising a gravity drop arm, a releaser supporting said arm, a sensitive substance enclosed within said releaser and located in the path of a leak current from an electric line insulator, and means for causing the arm to drop when the sensitive substance is traversed by the leak current.

2. An electric line insulator leakage indicator according to claim 1, in which the releaser is a case sealed with a stopper on which the gravity drop arm is suspended, and contains an explosive substance in a cartridge of dielectric material with contacts at either end of such cartridge one of which contacts is electrically connected to the insulator support and the other to earth.

3. An indicator according to claim 1, comprising a cup like releaser case pendent from and electrically connected with the pin of a line insulator, a plug of electrically insulating material luted into the mouth of said releaser, an earthed gravity drop arm suspended from said plug, and an explosive charge enclosed between contacts at opposite ends of it which contacts are electrically connected to the insulator pin and the drop arm respectively.

4. A device for indicating the insulating efficiency of line insulators in service, comprising a gravity drop earthed indicator which is pivot mounted on a post with its free end suspended by a releaser pendent from the insulator pin, and within the releaser a charge of a substance which when affected by a leak current of predetermined value passing through it from the pin to the indicator expands and breaks the mechanical support which sustains the arm.

In testimony whereof I affix my signature in presence of two witnesses:

ORLANDO WILLIAM BRAIN.

Witnesses:
T. K. FLANAGAN,
M. R. BENNETT.